United States Patent
Kundrot et al.

(10) Patent No.: US 6,647,390 B2
(45) Date of Patent: Nov. 11, 2003

(54) SYSTEM AND METHODS FOR STANDARDIZING DATA FOR DESIGN REVIEW COMPARISONS

(75) Inventors: Andrew Joseph Kundrot, Beverly, MA (US); Michael Howard Fisher, Cincinnati, OH (US); Keith Louis Gehring, West Chester, OH (US); Steven Alan Ross, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 346 days.

(21) Appl. No.: 09/845,450

(22) Filed: Apr. 30, 2001

(65) Prior Publication Data

US 2002/0161765 A1 Oct. 31, 2002

(51) Int. Cl.[7] .......................... G06F 17/30; G06F 15/16; G06F 17/60
(52) U.S. Cl. ...................... 707/10; 707/102; 707/104.1; 709/203; 715/513; 345/744
(58) Field of Search .................. 715/513; 709/203; 345/744; 707/10, 104.1, 102

(56) References Cited

U.S. PATENT DOCUMENTS

| 5,452,409 A | | 9/1995 | Smith |
| 5,933,830 A | | 8/1999 | Williams |
| 6,005,568 A | * | 12/1999 | Simonoff et al. ........... 345/335 |
| 6,073,163 A | * | 6/2000 | Clark et al. ................. 709/203 |
| 6,199,080 B1 | * | 3/2001 | Nielsen ....................... 715/513 |
| 6,256,628 B1 | | 7/2001 | Dobson et al. |

FOREIGN PATENT DOCUMENTS

| EP | 0 614 151 A1 | * | 9/1994 | ........... G06F/15/56 |
| WO | WO 01/63514 A1 | * | 8/2001 | ........... G06F/17/60 |

* cited by examiner

Primary Examiner—Frantz Coby
(74) Attorney, Agent, or Firm—William Scott Andes Armstrong Teasdale LLP; Robert B. Reeser, III

(57) ABSTRACT

A web-based system standardizes data from a plurality of different programs to facilitate design review comparisons in a cost-effective and reliable manner. The system includes a client system including a browser, a data storage device for storing information, and a server system coupled to the client system and the database. The server system is configured to store data in the data storage device in a standardized format, generate characteristics unique to the data input using pre-determined calculations, compare the characteristics to pre-determined target values, quantify shifts of the characteristics from respective target values, and generate standardized graphical representations of the data using based on the generated characteristics.

19 Claims, 9 Drawing Sheets

FIG. 5

SFC(%)

Pressure Name 270

Real % 100  Value 282  Tollgate 284

Opportunities Name 286

Real % 100  Value 288  Tollgate 290  291

Bar #2 Label 292
Bar #2 Value 294
Requirement 296

Margin Digits 2  300
Margin Calc. 302

Show Tollgate 298
Show Realization
Margin Status Bad

Add Edit Delete
On WaterFall Chart Display in List
308
316 — Y-axis MAX  0

Add Edit Delete
On WaterFall Chart Display in List
310
312  318 — Y-axis MIN  -2.0

Continue

You must hit Continue and then Submit on the Scorecard in order to Save

Your Margin

| Row # | Name | Realization Value | Realized Value | Tollgate | Display? |
|---|---|---|---|---|---|
| - 0.1 | Total | - 0 | - 0 | | |

Margin 304
- 0.1

Your Pressure

Your Opportunities

| Row # | Name | Realization Value | Realized Value | Tollgate | Display? |
|---|---|---|---|---|---|
| 1 | Preliminary 9 Stg HPC core test results | 70% | .2 | 0.14 | List |
| 2 | Work to understand & improve SL to cruise Eff loss | 70% | .3 | 0.21 | List |
| | Total | | .5 | 0.35 | |

Scorecard WorkSheet

Part Number: ☐
Part Nomenclature: ☐
Engine Family: CF34
Engine Model: amodel
Module: ☐

AEED Dept.: AEPD
Analyst: Smith
Last Saved Date: Jan 28
Last Baseline Date: ☐

| Class type | Item Characteristic | Units | Lower Spec Limit | Upper Spec Limit | Development Uncertainty | Mean Param. 1 | STD Dev/ Param. 2 | DPU | Zst | Target Z | Margin(+) Gap(-) | Status | Conf. | Comments |
|---|---|---|---|---|---|---|---|---|---|---|---|---|---|---|
| TR | EGT margin | Deg. C | 33 | | 0.0 | 43 | 12.0 | | 2.33 | 2.5 | | | M | Adams |
| TR | IFSD | % | | 0.015 | | 0.01 | 0.003 | | 3.17 | 3.0 | 1.5 | | H | Jones |
| TR | Departure Rate | % | 99.90 | | | 99.94 | 0.017 | | 3.85 | 3.0 | | | H | Jones |
| TR | Maintenance Cost | $K/Shop Visit | | 1840 | 0.0 | 2520 | 560 | | 0.29 | 2.0 | -900 | | M | Russell |
| TR | SFC | % | 0.00 | | 0.0 | 0.60 | 1.05 | | 2.07 | 2.5 | -0.1 | | M | Adams |
| TR | Weight | Lbs. | | 18445 | 184 | 18902 | 19.0 | | -6 | 3.5 | -666.45 | | M | Baker |
| TR | Noise | LHR db | | 939 | | 94.4 | 1.7 | | 2.38 | 2.3 | | | H | Romer |
| TR | Emissions | Nox | | 920 | 100 | 70.0 | 5.8 | | 5.29 | 2.5 | 266 | | H | Mitchell |
| TR | Shop Cost | $K | | 4500 | | 4442 | 18.0 | | 4.72 | 3.5 | | | H | Baker |
| TR | Development Cost | $M | | 458 | | | | | | | | | M | Smith |
| TR | Development Schedule | Mos. | | 1.0 | | 0.0 | | | | | | | M | Smith |
| TR | | % | 90.0 | | | | | | | | | | M | Smith |

FIG. 7

SYSTEM AND METHODS FOR STANDARDIZING DATA FOR DESIGN REVIEW COMPARISONS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever

BACKGROUND OF THE INVENTION

This invention relates generally to design review comparisons, and more particularly, to network-based systems and methods for standardizing data for design review comparisons.

Design review comparisons of data are often performed using data review surveys known as scorecards. In large organizations, a plurality of departments and users complete scorecards pertaining to information and data that is believed relevant to the success of a program. Because such information is used in determining system production schedules and system quality control reviews, often system, module, and component items considered critical to quality are monitored and tracked using the scorecards. Furthermore, because there is often a need to quantify program delays and surges, often the data gathered is compared from different components of a single program, or even between different programs.

To facilitate comparisons of the data, at least some known scorecards are completed using spreadsheet programs. In larger organizations, because a tremendous amount of items may be considered critical to quality, many different departments and users may complete a plurality of different scorecards. The scorecards were then amassed and manipulated to provide a desired set of results. Often, the information was also graphically displayed. However, gathering the data, analyzing the data, and graphically presenting the data in an understandable format may be a complex and time-consuming task. Furthermore, because the data is often manipulated to achieve comparable information, the results may be unreliable and skewed. In addition, because multiple applications are often used to compile the scorecard information, the current system often includes redundant development efforts. As a result, design review comparisons of data may be a costly process.

BRIEF SUMMARY OF THE INVENTION

In an exemplary embodiment, a web-based system standardizes data from a plurality of different programs to facilitate design review comparisons in a cost-effective and reliable manner. The system includes a client system including a browser, a data storage device for storing information, and a server system coupled to the client system and the database. The server system is configured to store data in the data storage device in a standardized format, generate characteristics unique to the data input using pre-determined calculations, compare the characteristics to pre-determined target values, quantify shifts of the characteristics from respective target values, and generate standardized graphical representations of the data using based on the generated characteristics. Furthermore, the system generates graphical displays that facilitate design comparisons in a cost-effective and reliable manner, while providing access control to the data based on user profiles.

In another embodiment, the system utilizes a method for generating graphical displays from a plurality of design review data that represent business applications from at least one of a system level, a module level, and a part level. The method includes the steps of assembling a knowledge base of data characteristics from the business application, selecting a type of design review to be displayed, displaying the data in a standardized format, using standardized calculations to determine margins of design deviations from pre-determined target values, and generating standardized graphical representations of the data using the calculated characteristics.

In another embodiment of the invention, the system is coupled to a centralized interactive database and at least one client system, and utilizes a method for standardizing data for design reviews in which data from a plurality of different programs is compared. The method includes the steps of inputting data into a centralized database in a standardized format, performing pre-determined calculations of the data with the system to determine characteristics unique to the data input, inputting events that shift the characteristics from respective pre-determined target values, and generating standardized graphical representations of the data using the calculated characteristics.

BRIEF DESCRIPTION OF THE DRAWINGS

FIG. 5 is an exemplary embodiment of a web page for inputting characteristics used to execute the flowchart shown in FIG. 3;

FIG. 6 is an exemplary embodiment of a calculation specification web page used to execute the flowchart shown in FIG. 3;

FIG. 7 is an exemplary embodiment of a printout web page used to execute the flowchart shown in FIG. 3.

DETAILED DESCRIPTION OF THE INVENTION

Exemplary embodiments of systems and processes that facilitate standardizing data input from a plurality of different programs for design review comparisons are described below in detail. The systems and processes facilitate, for example, displaying web-based data files in standardized graphical and tabular format. The systems and processes are not limited to the specific embodiments described herein, but rather, components of each system and each process can be practiced independently and separately from other components and processes described herein. Each component and process can also be used in combination with other components and processes.

Figure 1:
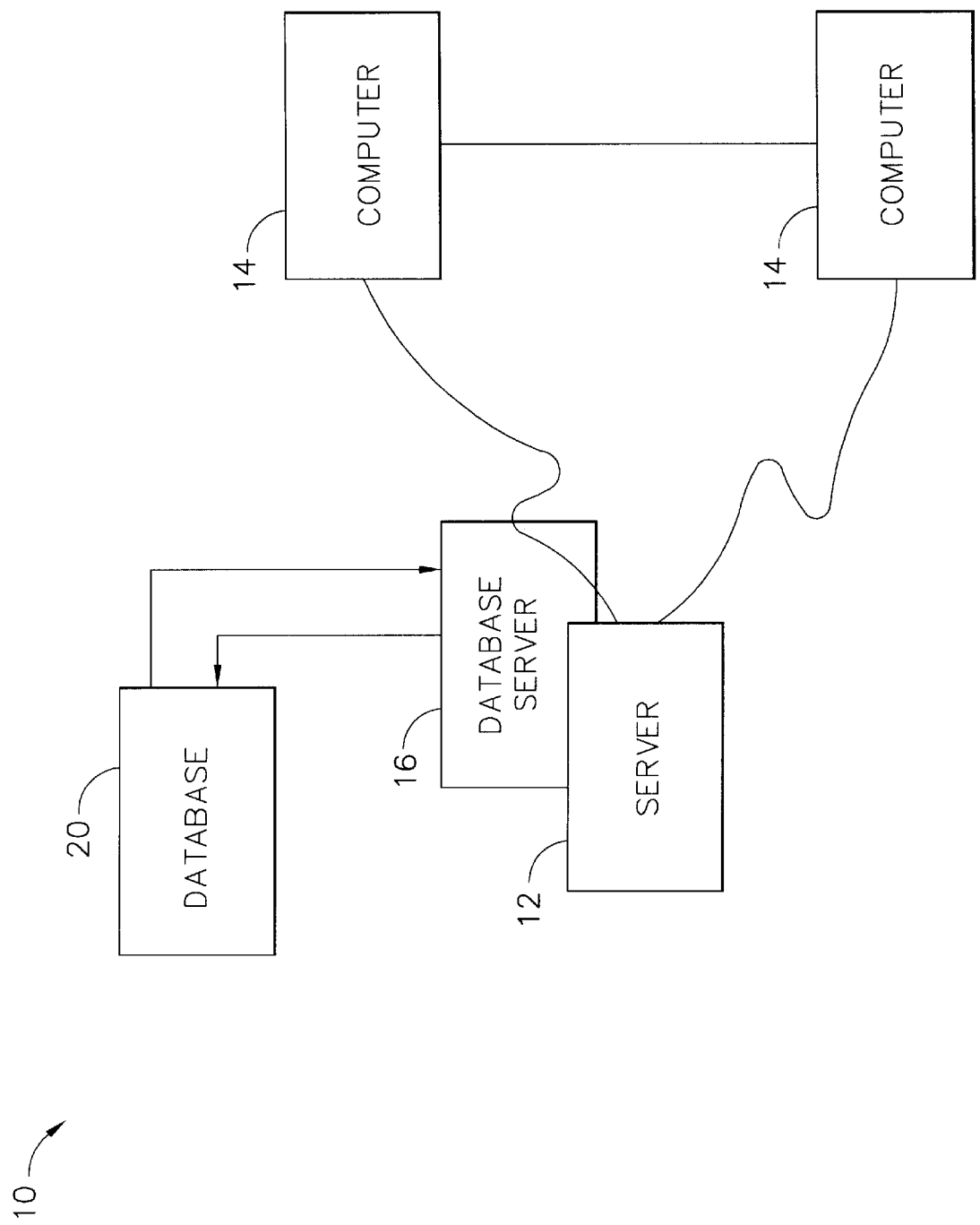
FIG. 1 is a system block diagram for a graphical design review system.

FIG. 1 is a system block diagram for a graphical design review system 10 for standardizing data input from a plurality of programs to facilitate design review comparisons of the data. In the exemplary embodiment, system 10 standardizes data related to engine components and associated business applications. System 10 includes a server 12 and a plurality of devices 14 connected to server 12. In one embodiment, devices 14 are computers including a web browser, and server 12 is accessible to devices 14 via the Internet. In an alternative embodiment, devices 14 are servers for a network of customer devices. System 10 is coupled to a mass storage device (not shown). In the exemplary embodiment, server 12 includes a database server 16 coupled to a data storage device 18.

Devices 14 are interconnected to the Internet through many interfaces including through a network, such as a local area network (LAN) or a wide area network (WAN), through dial-in-connections, cable modems and special high-speed ISDN lines. Alternatively, devices 14 could be any device capable of interconnecting to the Internet including a web-based phone or other web-based connectable equipment. A database providing enclosure information is stored on server 12 and can be accessed by users at one of devices 14 by logging onto server 12 through one of devices 14.

System 10 is configured to provide various user interfaces whereby users access web-based data files. More specifically, in the exemplary embodiment, system 10 is configured to provide a plurality of users access to web-based data files regarding gas turbine engine components. Server 12 accesses stored information and downloads the requested information to at least one of the client systems 14, when the request to download is received from client system 14. The databases are accessed by users using client system 14 configured with a standard web browser.

Figure 2:
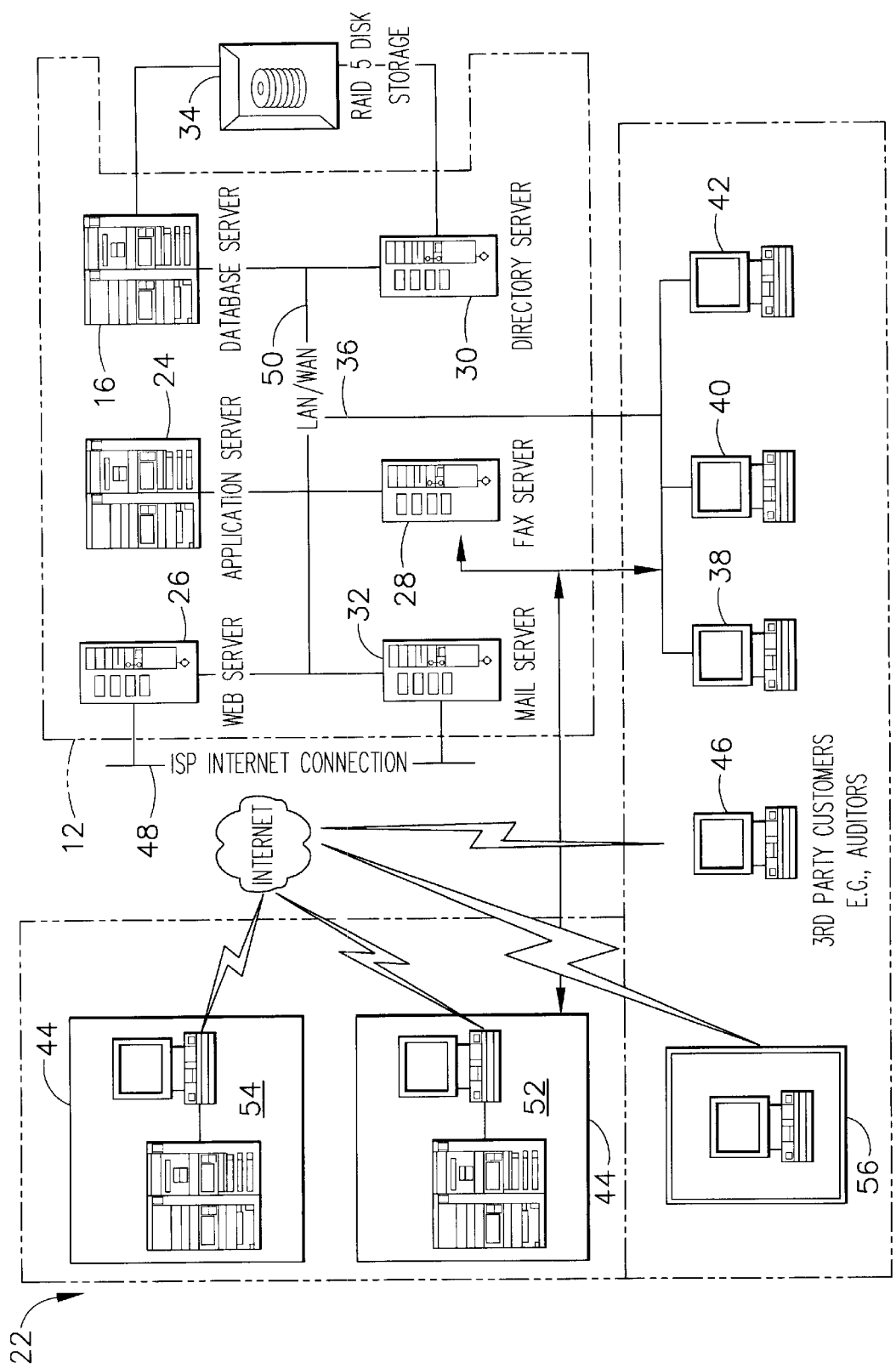
FIG. 2 is an expanded version block diagram of an exemplary embodiment of a server architecture of the graphical design review system.

FIG. 2 is an expanded version block diagram of an exemplary embodiment of a server architecture of a system 22 for standardizing data input from a plurality of programs to facilitate design review comparisons of the data. In the exemplary embodiment, system 10 standardizes data related to engine components and associated business applications. Components of system 22, identical to components of system 10 (shown in FIG. 1), are identified in FIG. 2 using the same reference numerals as used in FIG. 1. System 22 includes server sub-system 12 and user devices 14. Server sub-system 12 includes database server 16, an application server 24, a web server 26, a fax server 28, a directory server 30, and a mail server 32. A disk storage unit 34 is coupled to database server 16 and directory server 30. Servers 16, 24, 26, 28, 30, and 32 are coupled in a local area network (LAN) 36. In addition, a system administrator workstation 38, a user workstation 40, and a supervisor workstation 42 are coupled to LAN 36. Alternatively, workstations 38, 40, and 42 are coupled to LAN 36 via an Internet link or are connected through an intranet.

Each workstation 38, 40, and 42 is a personal computer having a web browser. Although the functions performed at the workstations typically are illustrated as being performed at respective workstations 38, 40, and 42, such functions can be performed at one of many personal computers coupled to LAN 36. Workstations 38, 40, and 42 are illustrated as being associated with separate functions only to facilitate an understanding of the different types of functions that can be performed by individuals having access to LAN 36.

In another embodiment, server sub-system 12 is configured to be communicatively coupled to various individuals or employees 44 and to users 46 via an ISP Internet connection 48. The communication in the exemplary embodiment is illustrated as being performed via the Internet, however, any other wide area network (WAN) type communication can be utilized in other embodiments, i.e., the systems and processes are not limited to being practiced via the Internet. In addition, and rather than a WAN 50, local area network 36 could be used in place of WAN 50.

In the exemplary embodiment, any authorized individual or an employee of the business entity having a workstation 52 can access server sub-system 12. One of user devices 14 includes a senior manager's workstation 54 located at a remote location. Workstations 52 and 54 are personal computers having a web browser. Also, workstations 52 and 54 are configured to communicate with server sub-system 12. Furthermore, fax server 28 communicates with employees located outside the business entity and any of the remotely located user systems, including a user system 56 via a telephone link. Fax server 28 is configured to communicate with other workstations 38, 40, and 42 as well.

Figure 3A:
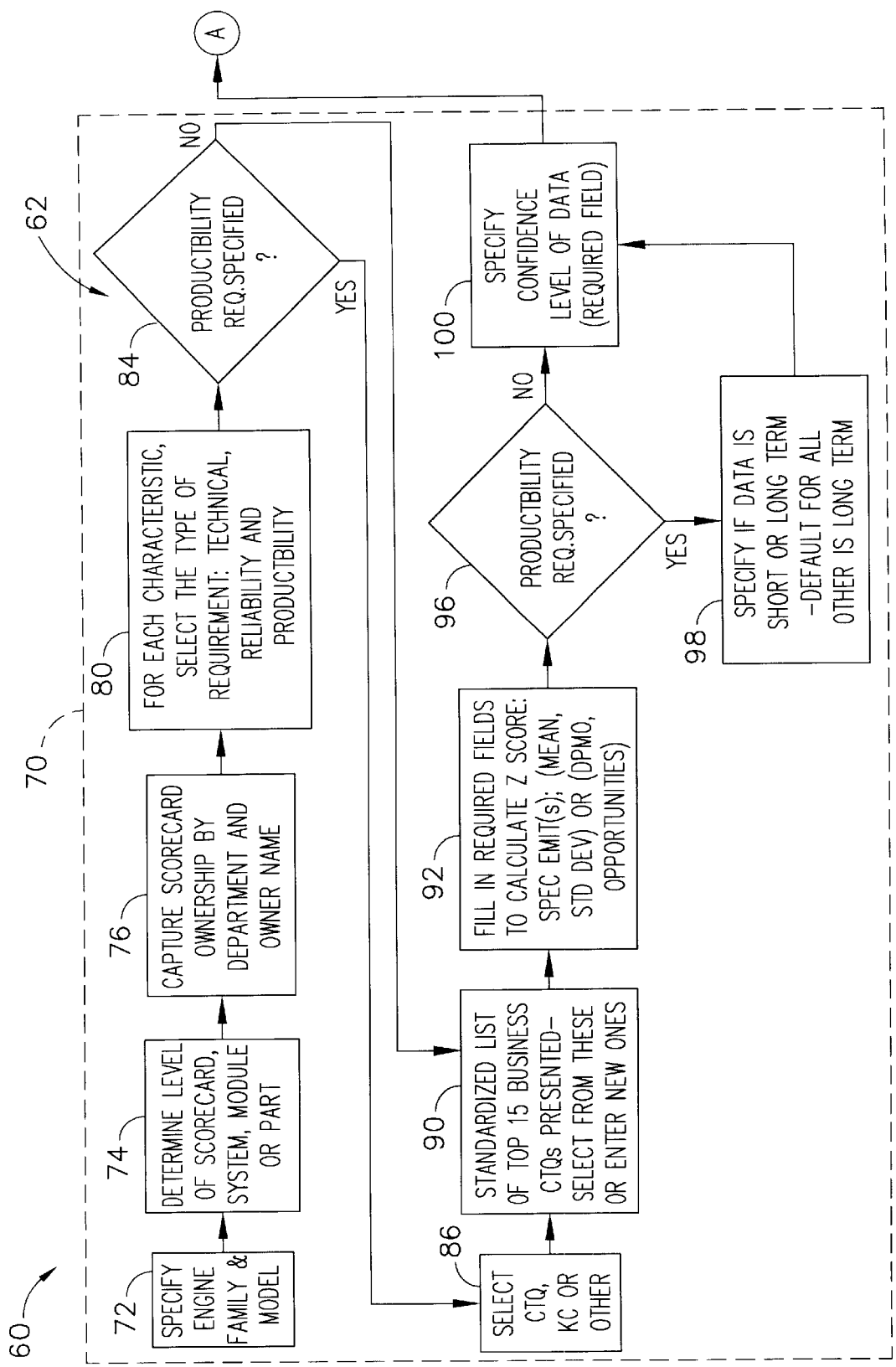
FIG. 3 is an exemplary embodiment of a flowchart illustrating an algorithm for standardizing data from a plurality of different programs to facilitate design review comparisons of the data.
Figure 3B:
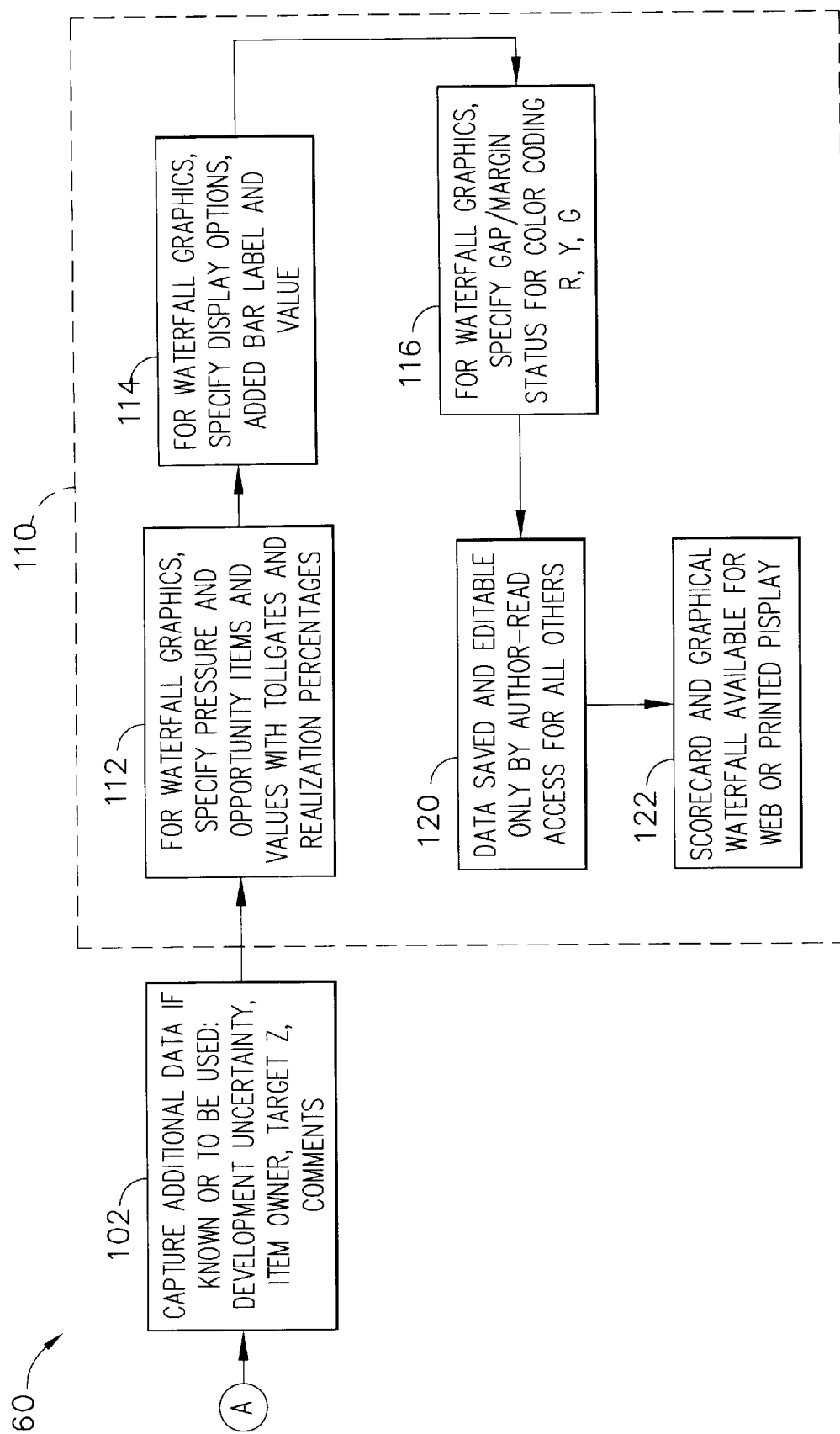

FIG. 3 is an exemplary embodiment of a flowchart 60 illustrating an algorithm 62 for standardizing data from a plurality of different programs to facilitate design review comparisons of the data. In the exemplary embodiment, algorithm 62 illustrates a process of standardizing engine component data and data from associated business applications, to facilitate reliable and accurate design review comparisons. Algorithm 62 is stored in a mass storage device (not shown) and is accessible to a potential user through a client system, similar to client system 14 (shown in FIGS. 1 and 2) to perform design review comparisons of data that is relevant to a plurality of different programs.

Initially data is accessed 70 for comparison. In the exemplary embodiment, the data is representative of engine characteristics. In an alternative embodiment, the data is not representative of engine characteristics. In a further embodiment, data is not accessed 70, but as described in more detail below, additional data is input used for design review comparison. More specifically, in the exemplary embodiment, in accessing 70 data characteristics, an engine an engine family and model are initially specified 72. For example, in one embodiment, a CF34 model A engine commercially available from General Electric Company, Cincinnati, Ohio is specified 72.

A level of scorecard comparison is then determined 74 that is based on the engine family and model specified 72. A scorecard is a template that is used to insure consistent data characteristics are input for design review comparisons. In the exemplary embodiment, a scorecard level is determined 74 to be at least one of an engine system, module, and a part. As a result, a knowledge base of engine characteristics are accessible by engine, model, and component. In addition, each scorecard also captures 76 ownership information, including an originating work department and a name of an originator.

Each characteristic accessed 70 is also selected 80 by at least one classification type. More specifically, the scorecards permit the characteristics to be categorized within a plurality of requirement classifications. In the exemplary embodiment, the data characteristics are further categorized according to at least one of technical requirements, reliability requirements, and producibility requirements.

If it is determined 84 that producibility requirements were selected 80 for each characteristic accessed, then a characteristic type is also selected 86. In the exemplary embodiment, the characteristic types available for selecting 86 include critical to quality (CTQ) characteristics, key characteristics (KC), and other characteristics. If CTQ characteristics are selected 86, then a standardized list of high level CTQs applicable to the data accessed 70 is generated 90.

If it is determined 84 that producibility requirements were not selected 80, then the standardized list of high level CTQs applicable to the data accessed 70 is generated 90 and a characteristic type is not selected 86. More specifically, characteristics may be chosen from the standardized list, as described in more detail below, or additional data may be input 92. Data that is input is used to calculate a "Z score", which represents a measure of standard deviations, or a statistical probality, from a mean. Furthermore, data that is input is also used to calculate a DPU value which represents a defects per unit value. In the exemplary embodiment, data entered includes at least one of an upper specification limit, a lower specification limit, a mean value, and a standard deviation.

An additional determination 96 is then made to determine if producibity requirements were specified. If it is determined 96 that producibility requirements were specified, the data is then further specified 98 as being long-term data or short-term data. Long-term data includes all current process performance data including sources of variation. Short-term data only contains the best performing sub-groups of data. If a distinction between long and short term data is not specified 98, long-term data is specified 98 as a default setting. If it is determined 96 that producibility requirements were not specified, long-term data is selected as the default setting.

Following determination 96, a value of a confidence level of the data is then specified 100. The confidence level of the data is a matrix of ratings that are based on a type of characteristic classification chosen. More specifically, the confidence data relates data fidelity to experience, analytical estimates, or a level of similarity to other parts. In the exemplary embodiment, at least one of a high, medium, and low confidence level is specified 100.

Additional data is also input 102 and utilized in standardizing data to facilitate design review comparisons. In the exemplary embodiment, such additional data includes a value representing development certainty, a target Z value, and any comments from the originator of the data.

In the exemplary embodiment, waterfall style graphic displays are generated 110. More specifically, to generate the graphic displays, values representing pressures and opportunities, tollgates, and realization percentages are specified 112 for specific individual characteristics. Pressures shift the characteristics adversely from each respective pre-determined target value, and opportunities shift the characteristics positively from each respective pre-determined target value. Tollgates are values that represent a specific milestone in an engine program. Realization factors are input for specific characteristics and represent a probability of a full value of a specific pressure or opportunity affecting the characteristic.

Additional values representing display options, graphical bar labels, and bar values are then specified 114. Furthermore, a graphical display color coding is also specified 116. The gap/margin status represents a shortfall known as a gap, or an excess known as a margin, of the current design from pre-defined values. More specifically, algorithm 62 uses standardized calculations to determine both statistical probabilities, as defined above, and defined gaps and margins of current designs from pre-defined requirements.

Figure 4:
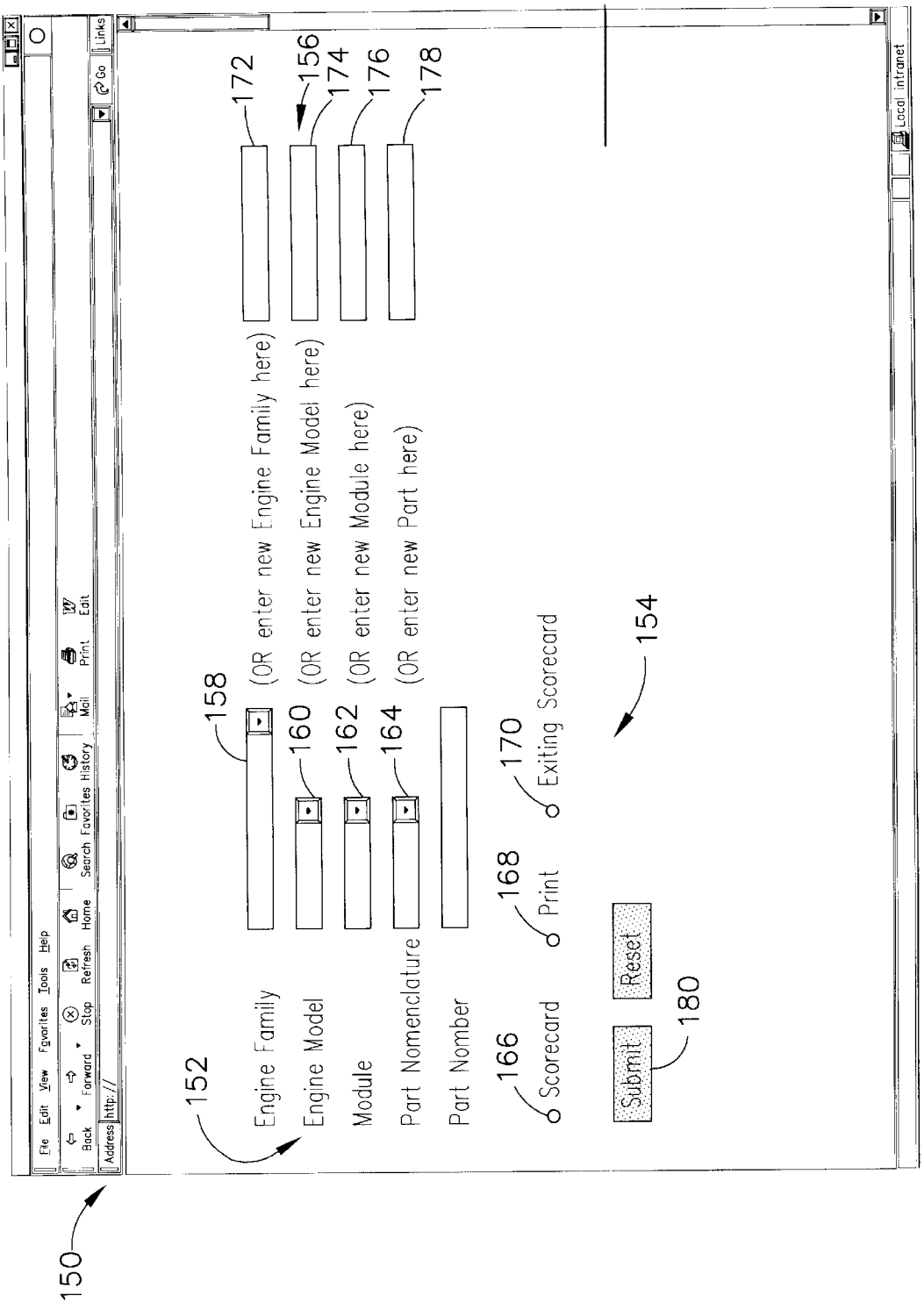
FIG. 4 is an exemplary embodiment of a main input and selection web page used to execute the flowchart shown in FIG. 3.

Data is then saved 120 such that the data is editable only by the author. Other users may have read-only user rights, but by default, do not have the ability to edit data saved by algorithm 62 or generated 110. After data is saved, scorecard and graphical waterfall displays may be available 122 for printing or viewing electronically. More specifically, the data is available in graphical and tabular standardized formats that provide flexibility to the user. Because algorithm 62 standardizes data, data from different programs, or different engine models, modules, systems, or components may be accurately and reliably compared. In addition to standardization, algorithm 62 also provides a common repository of information that is easily accessible through a system, such as system 10 or 22 (shown in FIGS. 1 and 2, respectively). Furthermore, data is printed in graphical and tabular outputs FIGS. 4 through 8 detail navigation through an exemplary web-site linked to system 10 (shown in FIG. 1) via device 14 (shown in FIG. 1) and server 12 (shown in FIG. 1) when flowchart 60 (shown in FIG. 3) is executed. More specifically, FIG. 4 is an exemplary embodiment of a main input and selection web page 150 used to execute algorithm 62 (shown in FIG. 3).

Main input and selection web page or screen 150 includes a plurality of pull-down selection menus 152, a plurality of radio buttons 154, and a plurality of data entry fields 156. More specifically, pull-down selection menus 152 include engine family menus 158, engine model menus 160, module menus 162, and part nomenclature menus 164 that permit a user to select data relevant to a specific engine program. Menus 158 and 160 facilitate data segregation and cataloguing and are known as meta-fields. Radio buttons 154 include a scorecard button 166, a print button 168, and an existing scorecards button 170. Data entry fields 156 include field 172 for entering a new engine family, a field 174 for entering a new engine model, a field 176 for entering a new module, and a field 178 for entering a new part. In addition, main input and selection web page 150 also includes a submit button 180 which when selected, saves new information, or selects for display, or printing, existing information.

To view an existing scorecard, an engine family, model, and a module, or a part number are selected through menus 158, 160, 162, and 164 respectively, and scorecard radio button 166 is also selected. Alternatively, a list of existing scorecards are accessible by selecting radio button 170. Submit button 180 will then display the information. In the exemplary embodiment, module selections represent different levels available for various engine families. For example, using pull-down menus 152, a user may select a CF34 engine family, model 10, and a configurations module. Users viewing existing scorecards have user rights to read the existing data, or enter "What-if" scenarios. What-if scenarios enable a user to perform design reviews based on proposed changes to an existing scorecard. For example, a user may examine the effect of changing a realization factor for a characteristic without having user rights to write/save new data inputs. Additionally, after the engine family, model, and module are selected through menus 158, 160, and 162, respectively, the scorecard may be printed by selecting print radio button 168. All selections are completed and data made available after submit button 180 is selected.

To create a new scorecard for a new engine model, respective data is input into data entry fields 156 and submit button 180 is selected. By default, a user creating a new scorecard has create/write/edit user rights. For example, submit button 254 (shown in FIG. 5) is not available for users with read-only user rights. After submitting data input into data entry fields 156, the user may enter additional data in two additional data entry screens (not shown in FIG. 4).

Each web-site linked to system 10 includes common elements that facilitate user navigation through system 10.

For example, each web-site includes pull-down selection menus that are both fixed and dynamic. As a result, the pull-down selection menus facilitate learning and retention of values, as well as modify and delete capability. Additionally, each web-site includes radio buttons, dynamic shading, check boxes, graphics applets, database read/write and modify, data entry validation, and data segregation and cataloguing by meta-fields specifying engine family and engine model.

Figure 5:
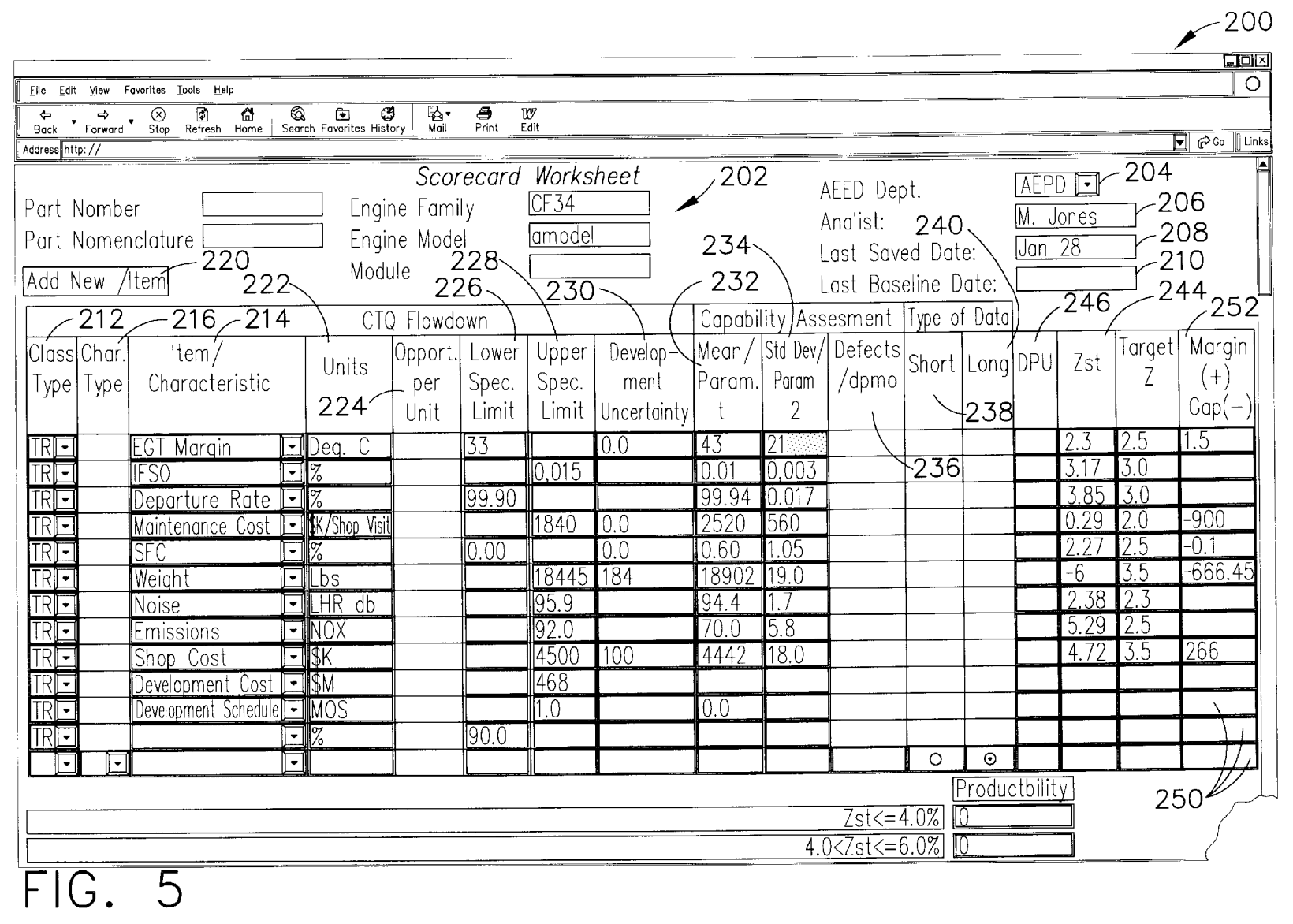

FIG. 5 is an exemplary embodiment of a web page 200 for inputting characteristics used while executing flowchart 60 (shown in FIG. 3). More specifically, web page 200 is linked to main input and selection web page or screen 150 (shown in FIG. 4) and is accessible when a new scorecard is being created, and data input into data entry fields 156 (shown in FIG. 4) is submitted. As discussed above, each scorecard also includes ownership information, including an originating work department and a name of an originator. More specifically, after data is entered in entry fields 156, additional entry fields 202 are available to accept data.

Entry fields 202 include a field 204 for inputting a work department of the originator of the new data, and a field 206 for inputting a name of the originator. Additionally, fields 208 and 210 respectively illustrate a date that data was last saved by the originator, and a date that last baseline data was entered into system 10 (shown in FIG. 1) based on the engine family and engine model selected.

Web-screen 200 includes a plurality of additional data entry columns 210. A classification type column 212 receives inputs pertaining to a type of classification being selected. For example, in the exemplary embodiment, column 212 permits a user to select TR for Technical Requirements, R for Reliablity Requirements, or P for Producibility Requirements. As discussed above, other columns are activated or dynamically shaded depending on which classifications are selected. For example, depending on the characteristic classification selected, a listing of high level CTQ characteristics are generated and displayed in an item/characteristic column 214 for the specified engine model and family. The list of high level CTQ characteristics are arranged alphabetically by default.

A particular characteristic may be selected for design review, and may then be modified. A characteristic type column 216 is only activated for produciblity scorecards, and receives inputs pertaining to a type of characteristic or item selected. For example, in the exemplary embodiment, column 216 identifies characteristics as CTQ or critical to quality, KC or key characteristics, or other Additionally, the list of high level CTQ characteristics may also be modified. For example, additional characteristics may be added by clicking an add new/item button 220. Furthermore, characteristics that do not apply to the scorecard being created, or which were made as incorrect entries may be deleted.

Additional information pertaining to the characteristic selected is then input into system 10 through web-screen page 200. More specifically, units may be designated for the characteristic using a units column 222. Opportunities per unit are designated using column 224, and a lower and an upper specification limit are designated using columns 226 and 228, respectively. Furthermore, a development uncertainty, a mean parameter, and a standard deviation parameter are designated using respective columns 230, 232, and 234. In addition, a value representing a number of defects per million output (dpmo), and a value indicating whether the data is short or long term data, may be input through columns 236, 238, and 240, respectively.

After the data has been input for submission, a value for a Z score representing a measure of standard deviations, or a statistical probability, from a mean is calculated within system 10 and displayed in column 244. Furthermore, data input is also used to calculate a DPU value which represents a defects per unit value. The DPU value is displayed within column 246. After entries have been made, selecting submit button 254 stores the results if the user has create/write privileges.

Depressing a gap button 250 within gap column 252 after the DPU and Z values have been calculated, displayed, and submitted, permits a user to enter pressures and opportunities on a gap calculation web-screen (not shown in FIG. 5).

FIG. 6 is an exemplary embodiment of a gap calculation specification web page 260 displayed after a gap button 250 (shown in FIG. 5) within gap column 252 (shown in FIG. 5) has been depressed, following the calculation of the DPU and Z values and submission of the data. More specifically, web-screen 260 permits pressures and opportunities to be entered for the particular characteristic selected. Pressures shift the characteristics adversely from each respective pre-determined target value, and opportunities shift the characteristics positively from each respective pre-determined target value Web page 260 includes an upper screen portion 262 and a lower screen portion 264. Upper screen portion 262 is used for editing and inputting data, and lower screen portion 264 is used to display individual pressures and opportunities, their realization factors, their full values, and indications of whether the pressures or opportunities will be displayed on a graphics page (not shown in FIG. 6) or merely grouped into a single entry entitled "Multiple Pressures" or "Multiple Opportunities".

Using upper screen portion 262, pressures are input by entering data into a name field 270, a realization factor field 282, and a tollgate field 284, and opportunities are input by entering data into a name field 286, a realization factor field 288, and a tollgate field 290. The realization factor represents the probability of the full value of this pressure or opportunity value affecting the characteristic. Whether each pressure or opportunity is listed uniquely on the graphics display or whether displayed as a group entitled Multiple Pressures" or "Multiple Opportunities, depends on the entries selected in graphic options fields 291.

Upper screen portion 262 also includes bar #2 Label and value fields 292 and 294, respectively, represent significant parameters that should be included in the calculations. A value for a requirements field 296 is also included in upper screen portion 262 and is set by default to the upper specification limit if the pressure sign is positive, as set in field 298, or to the lower specification limit if the pressure sign is indicated as negative. However, this value may be edited by the user.

A user may select a number of digits to display for a margin value using field 300. Additionally, a calculation button 302 may be selected whenever the user desires a calculation update. The value is displayed in lower screen portion 264 within field 304. Furthermore, selection boxes for the tollgate and/or the realization factor 308 and 310, respectively, permit the user to choose if the tollgate and the realization factor are displayed on the graphics display.

Other display options include a margin status field 312 which permits a user to select colors used with the graphics display. In the exemplary embodiment, the default selections are good=green, marginal=yellow, and bad=red. Furthermore, although auto-scaling is the default for graphics display, a user may select values for a Y-axis maximum and minimum using fields 316 and 318.

Upper screen portion 262 also includes a sort pressures and opportunities button. Selecting the sort button causes the pressures and opportunities to be sorted from highest to lowest based on realization values. By selecting margin calculation button 302 the margin value is calculated according to the method shown in FIG. 3 and the following algorithm:

If USL:

USL−{Mean Value (+/−) Bar #2 Value+Production Variation ((Target Z−1.5)*Sigma(standard deviation)+Development Uncertainty)+Pressures−Opportunities}, or If LSL:

{Mean Value (+/−) Bar #2 Value−Production Variation ((Target Z−1.5)* Sigma(standard deviation)−Development Uncertainty)−Pressures+Opportunities}−LSL FIG. 7 is an exemplary embodiment of a printout web page 350. More specifically, web page 350 is displayed when print radio button 168 (shown in FIG. 5) is selected from web page 200 (shown in FIG. 5). Web page 350 is a non-editable view of the scorecard that is suitable for presentation. Web page 350 displays values previously entered into system 10 (shown in FIG. 1) and permits a user to hyperlink to a graphics display using hypertext links displayed in gap column 252.

Figure 8:
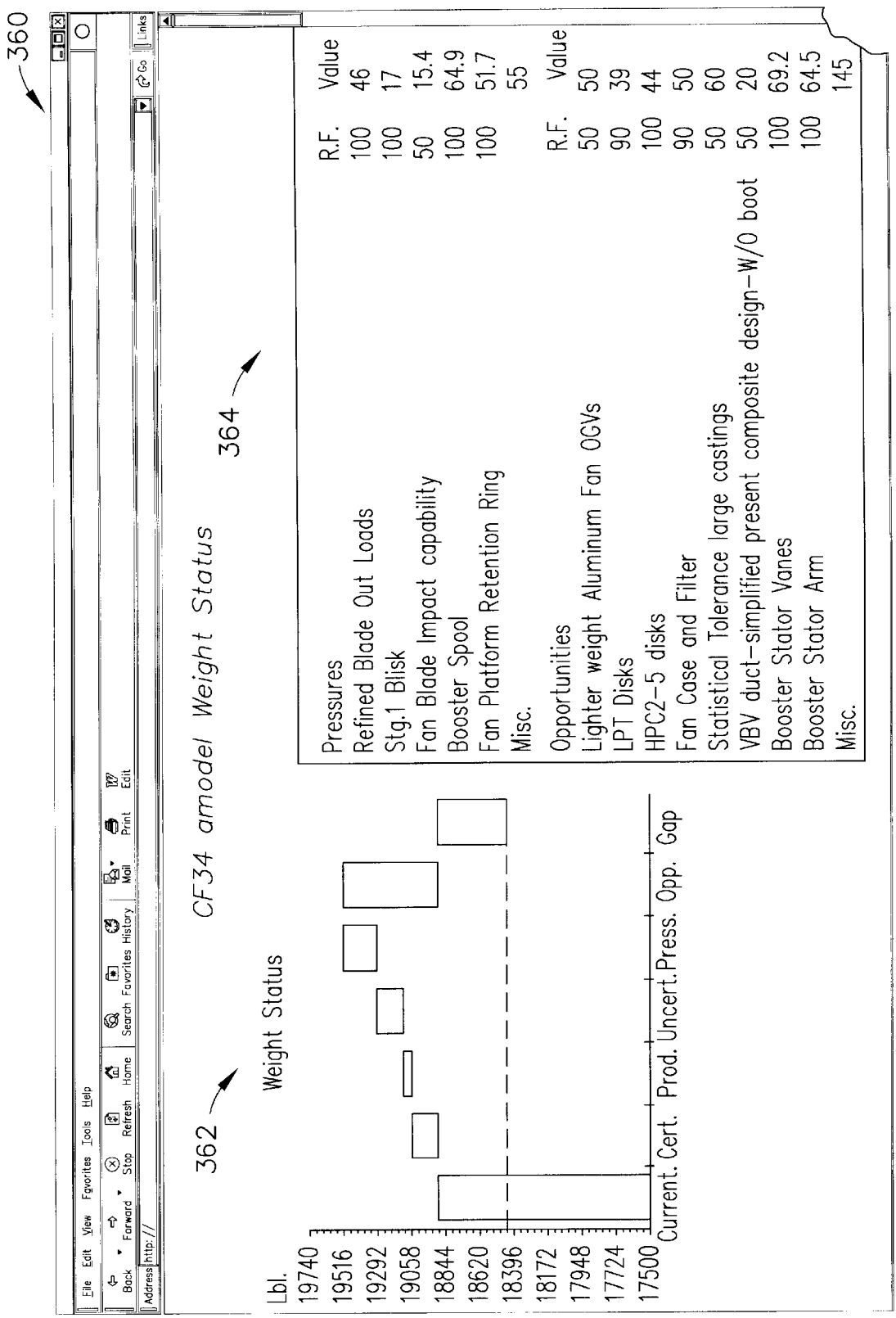
FIG. 8 is an exemplary embodiment of a graphical web page used to execute the flowchart shown in FIG. 3.

FIG. 8 is an exemplary embodiment of a graphical web page 360. More specifically, web page 360 includes a waterfall chart screen 362 and a tabular display 364. Waterfall chart screen 362 graphically displays a status of a particular characteristic, and also displays the pressures and opportunities that negatively and positively affect the characteristic relative to its requirement.

Tabular display 364 displays the pressures and opportunities of a specific characteristic and each associated realization factor and calculated value.

The above-described algorithm is cost-effective and highly reliable. The computer executing the algorithm standardizes data from a plurality of programs to facilitate comparisons and design reviews of the data. More specifically, the algorithm creates a tabular and graphical display that is standardized between programs. The algorithm also facilitates user accessibility while maintaining security restrictions. Furthermore, standardized calculations for both statistical probabilities of defects, as well as defined gaps or margins of current designs from their associated requirements are automatically performed. As a result, an algorithm is provided which when programmed into a computer, permits the computer to produce graphical displays that facilitate design review comparisons of data in a cost-effective and reliable manner.

While the invention has been described in terms of various specific embodiments, those skilled in the art will recognize that the invention can be practiced with modification within the spirit and scope of the claims.

What is claimed is:

1. A method for standardizing data for design reviews in which data from a plurality of different programs is compared using a web-based system that includes a server system coupled to a centralized interactive database, and at least one client system, said method comprising the steps of:

inputting data into a centralized database in a standardized format;

performing pre-determined calculations of the data with the system to determine characteristics unique to the data input;

inputting events that shift the characteristics from respective pre-determined target values; and generating standardized graphical representations of the data using the calculated characteristics.

2. A method in accordance with claim 1 wherein the data pertains to engine programs, said step of performing pre-determined calculations further comprises the step of determining at least one of a standard deviation, a mean, an upper specification limit, and a lower specification limit.

3. A method in accordance with Claim 1 wherein said step of inputting events that shift the characteristics further comprises the step of inputting at least one of pressures and opportunities, wherein the pressures shift the characteristics adversely from each respective pre-determined target value, and the opportunities shift the characteristics positively from each respective pre-determined target value.

4. A method in accordance with claim 1 further comprising the step of selecting a type of design review including at least one of a technical requirements, a reliability requirements, and a producibility requirements.

5. A method in accordance with claim 1 further comprising the step of creating a security model that limits access to the system and includes centralized administration of security of the system.

6. A method in accordance with claim 1 wherein said step of generating standardized graphical representations further comprises the step of selecting display options.

7. A method in accordance with claim 6 wherein said step of selecting display options further comprises the step of selecting at least one of a color, an axis label, an axis value, and a gap/margin value.

8. A web-based system for standardizing data from a plurality of different programs for design review comparisons, said system comprising:

a client system comprising a browser;

a data storage device for storing information;

a server system configured to be coupled to said client system and said database, said server system further configured to:

store data in said data storage device in a standardized format;

generate characteristics unique to the data input using pre-determined calculations;

compare the characteristics to pre-determined target values;

quantify shifts of the characteristics from respective target values; and generate standardized graphical representations of the data using based on the generated characteristics.

9. A system in accordance with claim 8 further configured to standardize data received from at least one of an engine system, an engine module, and an engine component, to generate characteristics unique to the data input, said server system further configured to calculate at least one of a standard deviation, a mean, an upper specification limit, and a lower specification limit.

10. A system in accordance with claim 8 wherein said server system further configured for at least one of a technical requirements design review, a reliability requirements design review, and a producibility design review.

11. A system in accordance with claim 8 wherein to quantify shifts of the characteristics from respective target values, said server system further configured to receive characteristic inputs representing at least one of adverse shifts from each respective pre-determined target value, and positive shifts from each respective pre-determined target value.

12. A system in accordance with claim 8 wherein said server system further configured control access to the system.

13. A system in accordance with claim 8 wherein to generate standardized graphical representations of the data using based on the generated characteristics, said server system further configured to receive inputs representing graphical display options.

14. A system in accordance with claim 13 wherein said server system further configured to receive graphical display option inputs representing at least one of a color, an axis label, an axis value, and a gap/margin value.

15. A method for generating graphical displays from a plurality of design review data representing business applications from at least one of a system level, a module level, and a part level, said method comprising the steps of:

assembling a knowledge base of data characteristics from the business application;

selecting a type of design review to be displayed;

displaying the data in a standardized format;

using standardized calculations to determine margins of design deviations from pre-determined target values; and generating standardized graphical representations of the data using the calculated characteristics.

16. A method in accordance with claim 15 wherein the design review data represents aircraft engine data, said method further comprising the steps of:

gathering information representing characteristics shifts from each respective target value; and storing the data characteristics in a centralized environment such that access to the information is securely limited.

17. A method in accordance with claim 16 wherein said step of using standardized calculations to determine margins of design deviations further comprises the step of:

calculating at least one of a standard deviation, a mean, an upper specification limit, and a lower specification limit; and determining an amount of defects per unit.

18. A method in accordance with claim 17 wherein said step of gathering information representing characteristics shifts from each respective target value further comprises the step of:

assigning weighted realization values to the characteristics; and determining at least one of pressures and opportunities, wherein the pressures shift the characteristics adversely from each respective pre-determined target value, and the opportunities shift the characteristics positively from each respective pre-determined target value.

19. A method in accordance with claim 17 wherein said step of generating standardized graphical representations of the data further comprises the step of selecting graphical display option inputs representing at least one of a color, an axis label, an axis value, and a gap/margin value.

* * * * *

UNITED STATES PATENT AND TRADEMARK OFFICE
CERTIFICATE OF CORRECTION

PATENT NO. : 6,647,390 B2
DATED : November 11, 2003
INVENTOR(S) : Kundrot et al.

It is certified that error appears in the above-identified patent and that said Letters Patent is hereby corrected as shown below:

Column 10,
Line 49, delete "based".

Column 11,
Line 6, delete "based".

Signed and Sealed this

Sixth Day of July, 2004

JON W. DUDAS
*Acting Director of the United States Patent and Trademark Office*